United States Patent [19]

Christiansson

[11] 4,171,768
[45] Oct. 23, 1979

[54] THERMOSTAT UNIT FOR CENTRAL HEATING RADIATORS

[76] Inventor: Fingal Christiansson, Horn, Västervik, Sweden, S-593 00

[21] Appl. No.: 846,249

[22] Filed: Oct. 28, 1977

Related U.S. Application Data

[63] Continuation of Ser. No. 621,096, Oct. 9, 1975, abandoned.

[30] Foreign Application Priority Data

| Oct. 22, 1974 [SE] | Sweden | 7413276 |
| Feb. 14, 1975 [SE] | Sweden | 7501665 |
| Jun. 5, 1975 [SE] | Sweden | 7506432 |

[51] Int. Cl.² ........................................... F24F 11/00
[52] U.S. Cl. .................................. 236/42; 236/99 R; 137/269
[58] Field of Search ................. 236/100, 99 R, 42, 43, 236/30; 137/269

[56] References Cited

U.S. PATENT DOCUMENTS 3,193,243   7/1965   Billington et al. ................. 251/96

FOREIGN PATENT DOCUMENTS 1051200 12/1966 United Kingdom ................. 236/42
1130797 10/1968 United Kingdom .

Primary Examiner—William E. Wayner
Attorney, Agent, or Firm—Pollock, Vande Sande & Priddy

[57] ABSTRACT

An individual thermostat unit for the valve housing of a central heating radiator replaces the conventional radiator valve mechanism and affords a simplified mounting without the need for modifications of pipe connections. This thermostat unit comprises two setting means, one for basic settings, and another for temperature settings. A setting knob gives different temperature settings by being turned on a thread. This same thread permits the setting knob to be screwed off as part of the housing of the unit, to make the basic setting means accessible when mounting the unit in a valve housing.

14 Claims, 5 Drawing Figures

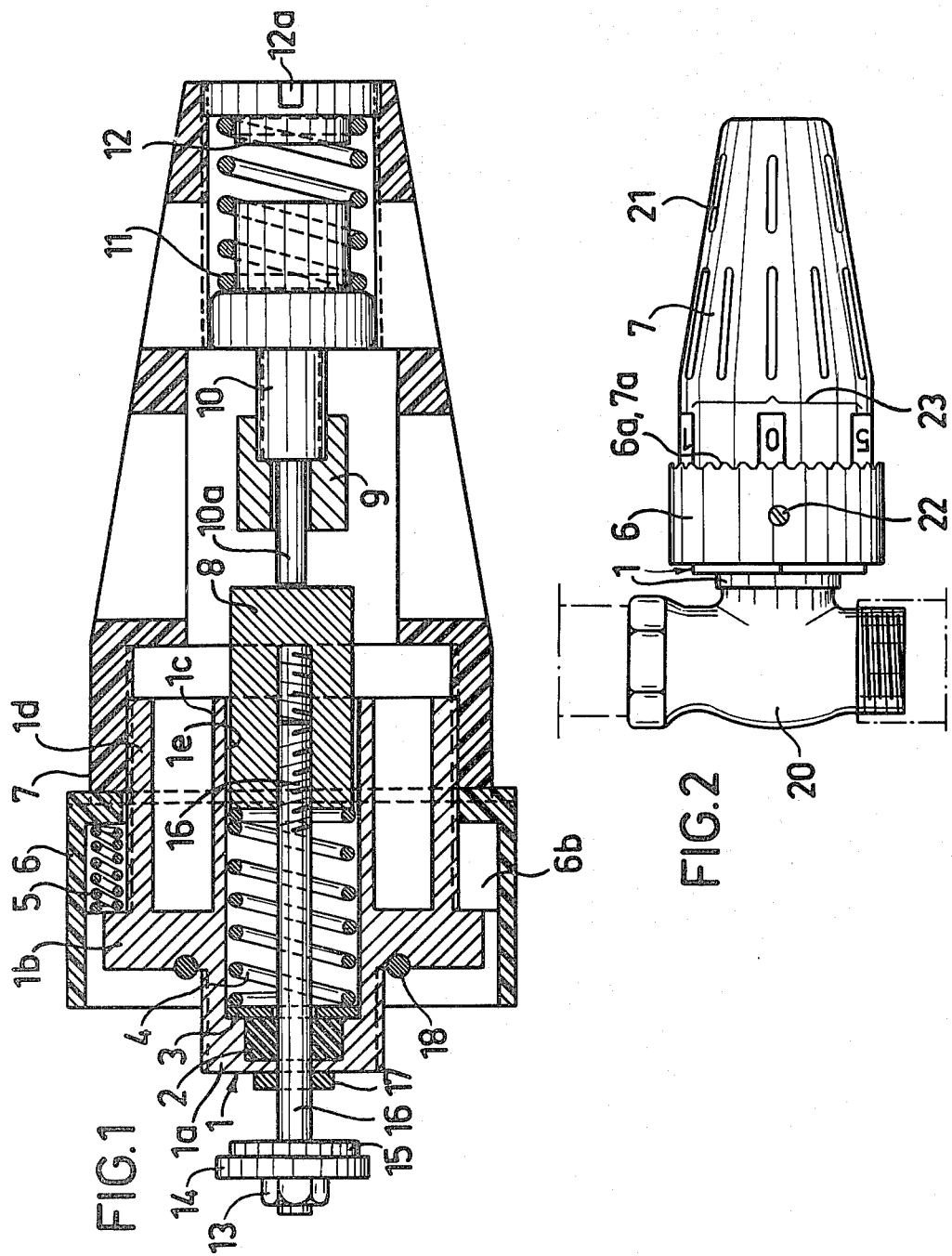

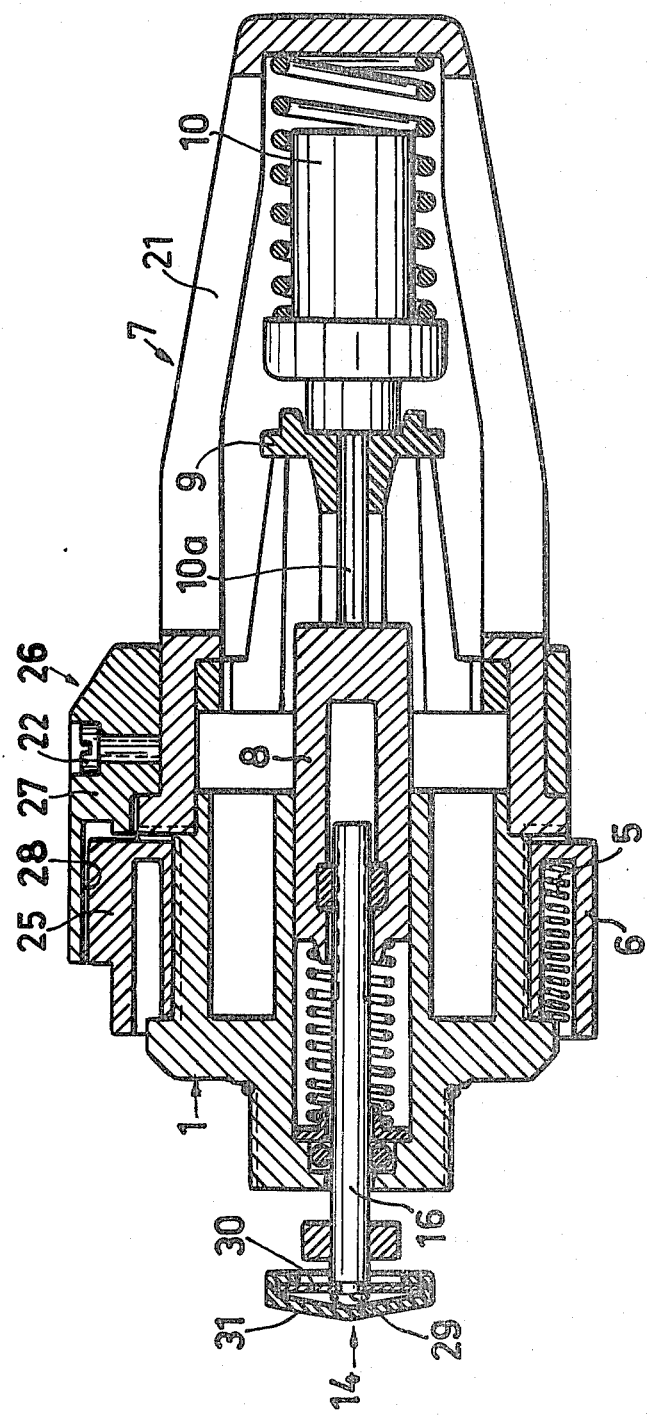

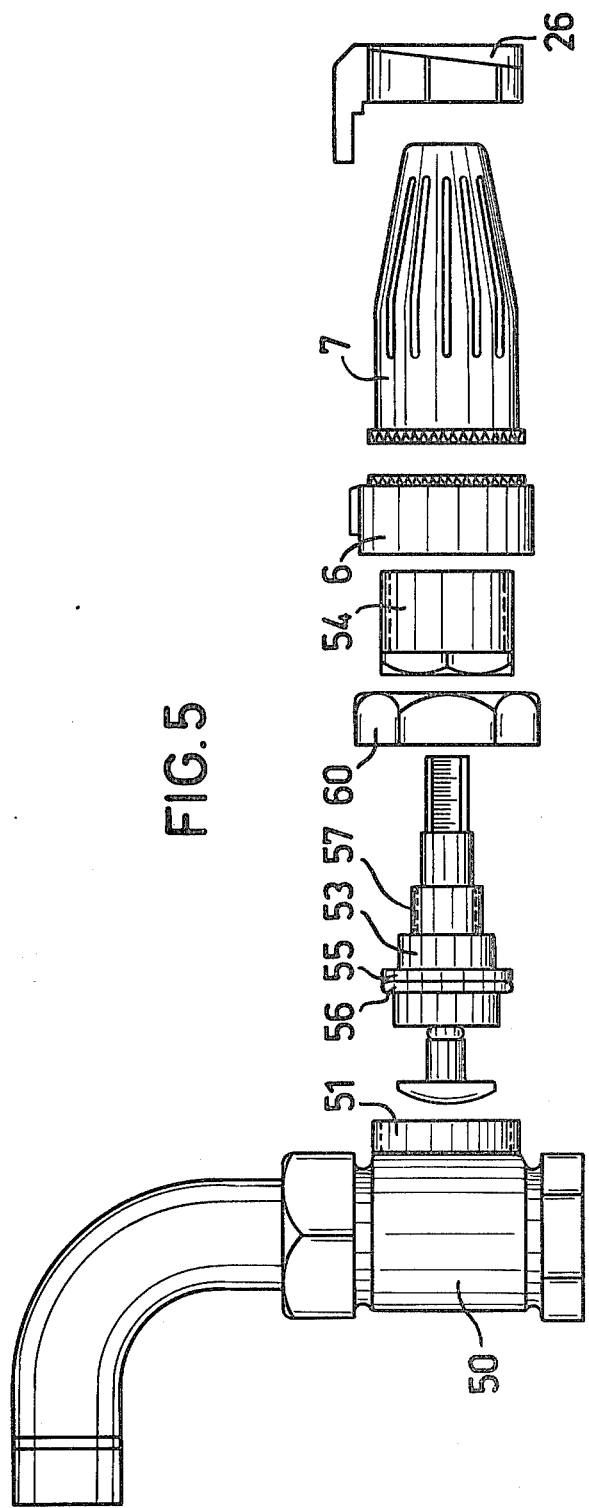

4,171,768

THERMOSTAT UNIT FOR CENTRAL HEATING RADIATORS

This is a continuation of application Ser. No. 621,096, filed Oct. 9, 1975 now abandoned.

BACKGROUND OF THE INVENTION

The need for an individual automatic temperature control in central-heated structures is felt to an increasing degree with the continued increase in energy costs. In central heating systems an individual thermostatic control of the different radiators has previously not been feasible. The prior known thermostat units require, for installation, rather extensive changes of the radiator connections, and since all the radiators in a building must be equipped with thermostat units if the full advantage of thermostatic control is to be attained, the necessary installation work may well be too extensive and costly to be deemed justifiable and compensated for by future savings.

SUMMARY OF THE INVENTION

It is a chief object of the invention, therefore, to provide a thermostat unit which can be mounted without any special adjustment by way of a simple substitution of the thermostat unit for the originally installed radiator valve mechanism. It is a further object of the invention to provide a thermostat unit affording double setting means which do not interfere with each other, one being for basic settings and the other for current temperature settings.

It is a still further object to make the basic setting means inaccessible from the outside and accessible only by removing a setting knob for temperature settings.

It is a still further object to provide means to prevent any unauthorized adjustment or unscrewing of the temperature setting knob except for a restricted adjustment in the retrograde, i.e. temperature-lowering sense.

BRIEF DESCRIPTION OF THE DRAWINGS

FIG. 1 is a longitudinal section of a first embodiment of the invention;

FIG. 2 is an elevation view of the unit of FIG. 1 on a smaller scale and mounted to a radiator valve housing;

FIG. 3 is a longitudinal section of a second embodiment;

FIG. 5 is an exploded view of a fourth embodiment suited for installation in heating systems employing radiator valves with an external coupling thread.

DETAILED DESCRIPTION OF THE PREFERRED EMBODIMENTS

Figure 4:
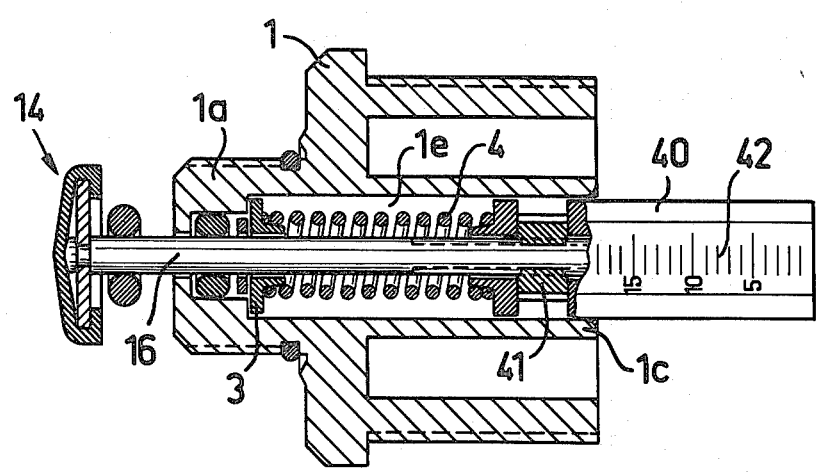
FIG. 4 is a similar section of a third embodiment, the setting knob with the sensing member having been left out.

Reference numeral 1 denotes a body or bushing member of brass or other suitable metal comprising a neck portion 1a with an external thread and a radial flange portion 1b from which there extends in the opposite direction of the neck 1a an inner axial flange 1c and an outer axial flange 1d. The flange 1c surrounds a central bore 1e in which a cylindrical member 8 is guided for axial travel, said member 8 forming a screwed-on extension of a valve stem 16 which extends through the bore and out from the neck 1a and carries at its free end a rubber member 14 supported by a rigid washer 15 and secured by a nut 13. The elements 13, 14, 15 form a valve member denoted hereafter 14 and capable of engaging or disengaging a seat in a valve housing 20 mounted in the usual manner in the inlet conduit of a non-illustrated central heating radiator, there being in conventional installations a valve mechanism or assembly screwed into said valve housing, to be replaced by the thermostat unit. The passage of the valve stem 16 through the neck 1a is sealed by means of O-rings 2 and 17, respectively. The O-ring 2 (or rather two rings) is received in a recess in the neck 1a which is closed by a washer 3 having a hole therein for the passage of the stem. In the free portion of the bore 1e a compression spring 4 is lodged, which is precompressed in such a manner that it will urge the valve stem in the opening direction by acting against the member 8. If the bushing 1 with the parts mounted thereon is screwed into the valve housing 20, the valve member will cooperate with the valve seat in the housing and will control the fluid flow to the radiator by assuming different axial positions. The outer axial flange 1d of the bushing 1 is formed with an external thread, and the radial flange 1b has a polygonal shape, preferably hexagonal. This flange is surrounded by an annulus 6, preferably of plastic, whose inner circumference has a corresponding polygonal shape. This annulus is capable of sliding axially along the flange 1b, but is prevented from rotating by reason of its angular shape.

The end face of the annulus 6 remote from the valve member is formed with teeth 6a for a purpose to be described presently. Compression springs 5 are lodged in recesses in the annulus wall, and oppose axial movement of the annulus to the left in the drawing. Such movements are finally checked by a shoulder 6b within the annulus which is shown in FIG. 1 as having abutted the flange 1b.

Onto the threaded portion of flange 1d a setting knob 7 is screwed. It is shaped substantially as a truncated cone with an internal thread at the large end mating with the flange thread. The knob 7 is formed with a longitudinal bore with a stepwise reduced diameter. At its larger end face the knob is formed with teeth 7a mating with the teeth of the annulus 6. When these teeth are in interlocking engagement, the knob is held against rotation, and it can be turned only if the annulus 6 is urged back against the spring loading, that is towards the left in the drawing. Upon being rotated, the knob is displaced axially by virtue of its threaded engagement with the flange 1d.

Within the bore of the knob 7 there is lodged a temperature-sensing member 10, preferably a wax element. This sensing member has an axially extending pin 10a moving longitudinally on temperature variations. This pin may be guided laterally by a bushing 9 fixed to the sensing member, for increased stiffness. The sensing member is held against rearward displacement by a compression spring 11 abutting an end plug 12 screwed into a thread formed in the bore of the knob. The compression spring 11 is stronger than compression spring 4, and its normal state is one of non-compression.

The pin 10a engages by its free end the cylindrical member or valve stem extension 8, and the force exerted by the sensing member and the spring 4, respectively, displaces the valve member 14 towards or away from the valve seat in dependence on temperature variations, and accordingly controls the fluid flow through the radiator. The temperature setting is changed by turning the knob after pushing back the annulus 6. The arrangement is "childproof" since setting adjustments require a coordinated action of both hands.

For minor adjustments of the thermostat settings the plug 12 may be turned by engaging a coin in the slot 12a, the size of the coin preventing any excessive inward adjustment. For a datum setting, the axial adjustability of the member 8 relative to the valve stem 16 is used. These parts, being connected by mating threads, are capable of relative longitudinal adjustment by being rotated relative to each other. For this adjustment, setting knob 7 must be screwed off.

The outer wall of the knob 7 is broken through by a plurality of slits 21 (FIG. 2) to give free access of ambient air to the sensing member. This will enable temperature variations to cause corresponding displacements of the valve member.

The annulus 6 is provided with an index mark that may preferably be a screw 22 engaging a radial bore extending through the wall of the annulus. When a temperature setting has been selected by turning the knob 7, the large end of which is graduated as at 23, the annulus can be locked in its position by tightening the screw 22. The setting cannot be changed thereafter, unless the screw is loosened. The compression spring 11 supporting the sensing member 10 protects the knob 7 from splitting if subjected to excessive heat such as by strong sun radiation. The additional expansion will be absorbed by the spring 11 being shortened.

The thermostat unit now described is very simple to install as a replacement of valve assemblies already in operation. Any such measures as sawing off piping and cutting new threads are unnecessary. The valve mechanism is simply screwed off, and the thermostat unit is screwed on, and is ready to control room temperature at the desired level. Sealing between the bushing 1 and the valve housing 20 may be attained by means of an O-ring 18 received in an annular groove at the radially inner portion of the flange 1b. Setting and adjustment is effected in the manner previously described, after the positive engagement between the knob 7 and the annulus 6 has been temporarily suspended, as described.

The thermostat unit may easily be modified into a valve mechanism without a thermostatic function, and vice versa. For that purpose the sensing member 10, the spring 11 and the plug 12 are replaced by a screw, preferably made of plastic, which is screwed into the thread of the knob 7 at the outer end thereof, and which abuts with its free end the member 8. On turning the knob, the valve member 14 will travel axially due to the axial displacement between the knob and the bushing 1. If radiators are equipped in this simplified way from the outset, it is readily possible to provide thermostatic control at a later stage by substituting the aforesaid components 10, 11, 12 for the rigid screw.

A second embodiment of the thermostat unit is illustrated in FIG. 3.

This device is constructed in most essentials like the unit described in conjunction with FIGS. 1 and 2. Only those parts differing essentially from those of the first embodiment need therefore be described.

Thus, the annulus 6 is formed with an axially extending rib or key 25 the purpose of which will be explained presently. The setting knob 7 is formed at its inner end with a thickened rim at the end face at which are formed the teeth that mate with the teeth of annulus 6. At the cylindrical inner end portion of the knob, an indexing ring 26 is mounted which is capable of axial and rotary relative movement. This ring has an axially projecting portion 27 with a keyway 28 therein for receiving the rib 25. In the illustrated position, the rib engages the keyway, and the ring 26 thus is held against rotation relative to the annulus 6. This arrangement prevents the turning of setting knob 7 even after axial displacement of the annulus, against the power of the springs 5, to disengage the mating locking teeth. This result is attained by reason of the engagement between key 25 and keyway 28 and by the indexing ring being rigidly locked to the setting knob by means of a set screw 22 held in a threaded radial bore in a thickened portion of the ring 26. The head of the set screw may be sealed to prevent any unauthorized adjustment.

It may be desirable, however, that the tenants of an apartment building should be able to set a lower temperature than the one corresponding to a fixed setting as described above. For that purpose, the engagement between the rib or key 25 and the keyway 28 is dispensed with. Instead, the abutment of rib 25 against one flank of the projecting portion 27 is used as a normal setting datum. The tenant will then be able to set a lower temperature (e.e. night temperature) by turning the knob 7 away from this end position, but he cannot set a higher temperature than the predetermined one by turning the knob in the opposite sense.

For a smooth operation of the valve member and for avoiding disturbing noises otherwise common in radiator valves, it is essential that the valve member can adjust itself to the valve seat in the valve housing. For that purpose, the valve stem 16 is shaped at its end with a thinner portion 29, and a metal washer 30 is held by that portion with some clearance, to enable the washer to assume an oblique position. The outer end of the portion 29 is upset, to form a head, and the length of this portion inside the head is greater than the thickness of the washer, to permit the washer to adjust itself.

A sealing member 31 of rubber or like material having an overlapping rim is mounted over the washer and is held taut by the latter, thus affording a smooth resilient sealing surface against the valve seat. This sealing member is easy to replace, if necessary. This embodiment lacks an adjusting plug at the small end of the setting knob 7. The latter is formed with an integral rear surface, instead. Referring now to FIG. 4, numeral 1 again denotes a body or bushing of brass or other suitable metal with a threaded neck 1a for screwing into a radiator valve such as valve 20 in FIG. 2. The valve stem 16 passing through the bushing 1 is guided by a central bore in the bushing as well as by a washer 3 received in the widened central recess 1e of the bushing. The compression spring 4 abuts with one end the washer 3 and with the opposite end a setting member 40 corresponding to member 8 in FIG. 1. This member is preferably made of plastic having a metal sleeve 41 molded into it. Internal threads in this sleeve engage the threaded rear end portion of the valve stem which extends into a central relief bore (not illustrated) in member 40. By turning the setting member 40, the free end of which forms an abutment for the sensing member operating pin 10a (FIG. 1), the member 40 will project a longer or shorter distance beyond the bushing 1. This will permit the spring 4 to be compressed to the same degree, irrespective of the different distances that may occur in various valve housings between the valve seat and the abutting face of the socket of the valve housing into which the bush 1 is screwed. Consequently, the spring force acting against the force exerted by the sensing member will be equalized. In practice, this is effected in such a manner, that for the smallest-sized valve for which the thermostat unit is suited, the setting member 40 will be set to a given reading on the scale 42, for example 15 millimeters. After making this setting, and screwing the bushing into the valve housing, a reading is taken on scale 42 after urging the valve stem to engage the valve member with the valve seat. If this reading is 12 millimeters on the scale, the valve stroke will be 3 millimeters. For a larger-sized valve housing, a longer valve stroke will be necessary, but to the same final length of the spring 4. In this instance, the setting member is screwed outwards for example to a reading of 17 on the scale, whereas the reading for the shut valve would still be 12. The valve travel will be longer, but the operating force will remain unchanged.

The setting member 40 preferably has a polygonal cross section, such as hexagonal, to afford a sure grip when being turned and to offer a flat background to the scale 42. The readings are best taken along the end face of the axial flange 1c of the bush.

It should be appreciated that the setting arrangement now described will greatly facilitate an adequate adjustment from the outset and a simple adaption to different-sized radiator valves which may be effected on installation of the thermostat unit without the need for additional measures before or after.

Another embodiment of the thermostat unit illustrated with the exploded view in FIG. 5 differs from those already described mainly by being adapted for mounting on a valve housing 50 having an external coupling thread 52 for engaging a union nut 60 separate from the unit as such. This will facilitate the mounting of the unit in a valve housing in which the nut 60 has previously served to secure the conventional valve mechanism.

To make this kind of mounting possible, the body or bushing 1 of the embodiments already described has been replaced by a valve stem guide member 53 and a bushing member 54. The member 53 is formed with a radial flange 55 for sealing against the rim of the valve housing socket 51, an O-ring 56 being interposed as a seal. The nut 60 is formed with a shoulder for clamping the flange 55 to the valve housing, and an external thread 57 cut on guide member 53 receives the internally and externally threaded bushing member 54. In all other respects, this embodiment is the same as the embodiments illustrated in FIGS. 3 and 4.

The chief advantage of this embodiment is that the union nut 60 of the existing radiator valve will be used, thereby dispensing with the practically non-feasible task of manufacturing the units so as to fit the threads and dimensions of valve housings having an external coupling thread, as such housings are often provided with obsolete and non-standardized threads. This difficulty does not appear, as a rule, in valve housings having an internal coupling thread, when mounting thermostat units such as described with reference to FIGS. 1 to 4.

What I claim is:

1. A central heating radiator valve thermostat control unit comprising a body member, an external thread on said body member, an annular member secured against rotation relative to said body member, said annular member being capable of axial sliding movement along said body member, teeth shaped at one end face of said annular member, an essentially frusto-conical hollow setting knob, an internal thread formed in the large end portion of said setting knob for engaging said external thread, teeth shaped at the large end face of the said setting knob, spring means operative to urge said annular member towards said setting knob to make their respective teeth intermesh for locking the setting knob in any selected angular position, a spring-biased valve stem guided for longitudinal movement in said body member, a valve member adapted for operation within a radiator valve housing when said body member is mounted in operative relationship thereto, said valve member being secured to a projecting end portion of said valve stem, a temperature sensing body held within the cavity of the said setting knob, said sensing body engaging by an operative part thereof the end of said valve stem, to control the axial position of said valve stem in dependence of temperature variations.

2. A central heating radiator valve thermostat control unit as defined in claim 1, the annular member being formed with a longitudinal projection, a ring member journalled on said setting knob and having means for locking it thereto, said ring member being formed with a recessed axial extension for engaging said longitudinal projection, to provide an abutment for preventing at least turning of the said setting knob in excess of a predetermined angle.

3. A central heating radiator valve thermostat control unit as defined in claim 1, the said temperature sensing body abutting compression spring means, said spring means being of design length in normal operating conditions of the thermostat control unit.

4. The thermostatic control unit of claim 1 which is particularly adapted as a replacement for a conventional non-thermostatic control valve in a central heating radiator and in which the radiator defines a valve-receiving portion which is externally threaded and includes also a matingly threaded union nut normally securing said conventional control valve to the radiator housing, said control unit comprising:
  at least one annular abutment on said body member;
  said at least one annular abutment supporting a sealing means for effecting sealing engagement with said valve-receiving housing;
  said at least one annular abutment further engaging with said union nut to secure said control unit with said valve-receiving housing;
  whereby the originally installed union nut may be used to secure said thermostatic control unit as a replacement for the conventional control valve.

5. Valve apparatus for installation in the housing of a radiator valve in a central heating system and particularly adapted for connection to a radiator valve housing as a replacement for a conventional valve mechanism inserted in an externally threaded aperture in said valve housing and secured in place by a union nut threadably engaging said aperture, said valve apparatus comprising:
  a guide bushing threadably connectable to a radiator valve housing having a valve seat supported therein,
  said guide bushing comprises a valve stem guide member and a bushing member,
  a valve member for selective engagement with said valve seat and having a valve stem means,
  spring means supported in said bushing for urging said valve member away from said valve seat,
  temperature sensing means for moving said valve member,
  said valve stem guide member supporting said valve member, said spring means and said temperature sensing means, a setting knob enclosing said valve stem means and said temperature sensing means, means responsive to rotation of said knob relative to said supporting means to move said valve stem means axially and thereby to move said valve member relative to said valve seat, adjusting means enclosed within said setting knob for providing manual axial adjustment of the length of said valve stem means, said valve stem guide member having a radial flange for effecting sealing engagement with the rim of said aperture, and said union nut having a shoulder engaging said radial flange when said union nut is threaded onto the external threads of said aperture, said bushing member having internal threads for threading engagement with external threads on that portion of said valve stem guide member which is positioned externally of said union nut, said bushing member having threaded engagement with said setting knob, said threaded engagement permitting removal of said setting knob to permit manual adjustment of said adjusting means.

6. A valve assembly for thermostat valves of central heating radiators including means for the mounting of said valve assembly to a valve housing, a valve spindle having a valve member at one end thereof for cooperation with a valve seat provided within said valve housing, a spindle extension having a threaded connection with said valve spindle, compression spring means abutting at one end structure which is stationary relative to said mounting means and operative to urge said valve spindle into a retracted position in which said valve member is moved away from said valve seat, said compression spring means having its active length determined by the longitudinal position of said spindle extension relative to said valve spindle, markings on said spindle extension for adjustment of said active spring length according to a selected valve, means for actuating said spindle extension against the force of said compression spring by a temperature sensing body acting against the free end of said spindle extension.

7. The valve assembly of claim 6 in which the markings on said spindle extension comprise graduations to provide a visual indication of the extent of longitudinal adjustment of said spindle extension relative to said valve spindle.

8. The valve assembly of claim 7 in which said spindle extension is of polygonal cross-section and bears said graduation markings along one of its flat sides.

9. Valve apparatus for installation in the housing of a radiator valve in a central heating system comprising:
a guide bushing threadably connectable to a radiator valve housing for a valve seat,
a valve member for selective engagement with said valve seat and having a valve stem means,
spring means supported in said bushing for urging said valve member away from said valve seat,
temperature sensing means for moving said valve member,
a setting knob enclosing said valve stem means and being threadably connected coaxially to said bushing in a manner permitting relative axial adjustment of said knob and said bushing, said setting knob having a configuration giving access to said valve stem means upon removal of said setting knob from said guide bushing, means responsive to rotation of said knob relative to said bushing to cause actuation of said valve member relative to said valve seat;
said valve stem means comprising a valve stem and a valve stem extension, said valve stem extension projecting beyond said guide bushing and being connected to said valve stem by mating threads for adjusting the operative length of said valve stem assembly,
said valve stem extension having graduation markings.

10. Valve apparatus for installation in the housing of a radiator valve in a central heating system comprising:
a guide bushing threadably connectable to a radiator valve housing for a valve seat,
a valve member for selective engagement with said valve seat and having a valve stem means,
spring means supported in said bushing for urging said valve member away from said valve seat,
temperature sensing means for moving said valve member,
a setting knob enclosing said valve stem means and being threadably connected coaxially to said bushing in a manner permitting relative axial adjustment of said knob and said bushing, said setting knob having a configuration giving access to said valve stem means upon removal of said setting knob from said guide bushing,
means responsive to rotation of said knob relative to said bushing to cause actuation of said valve member relative to said valve seat,
said valve stem means comprising a valve stem and a valve stem extension, said valve stem extension projecting beyond said guide bushing and being connected to said valve stem by mating threads for adjusting the operative length of said valve system assembly,
said valve stem extension having a polygonal cross section, one at least of its flat sides having graduation markings.

11. The thermostatic control unit of claim 9 which is particularly adapted as a replacement for a conventional non-thermostatic control valve in a central heating radiator and in which the radiator defines a valve-receiving portion which is externally threaded and forms a valve seat and includes also a matingly threaded union nut normally securing said conventional control valve to the radiator housing, said control unit comprising:
at least one annular abutment on said bushing;
said at least one annular abutment supporting a sealing means for effecting a sealing engagement with said valve seat,
said at least one annular abutment further engaging with said union nut to secure said control unit with said valve-receiving housing;
whereby the originally installed union nut may be used to secure said thermostatic control unit as a replacement for the conventional control valve.

12. Valve apparatus for installation in the housing of a radiator valve in a central heating system comprising:
a guide bushing threadably connectable to a radiator valve housing for a valve seat,
a valve member for selective engagement with said valve seat and having a valve stem means,
spring means supported in said bushing for urging said valve member away from said valve seat, temperature sensing means for moving said valve member, a setting knob enclosing said valve stem means and being threadably connected coaxially to said bushing in a manner permitting relative axial adjustment of said knob and said bushing, said setting knob having a configuration giving access to said valve stem means upon removal of said setting knob from said guide bushing, means responsive to rotation of said knob relative to said bushing to cause actuation of said valve member relative to said valve seat, said valve stem means comprising a valve stem and a valve stem extension, said valve stem extension projecting beyond said guide bushing and being connected to said valve stem by mating threads for adjusting the operative length of said valve stem assembly, mounting means comprising a hollow setting knob member receiving in its cavity said temperature sensing means for operative engagement with said valve stem extension, said knob member having a threaded engagement with said body member to transmit rotation thereof into axial travel for setting a desired temperature, said setting knob having a generally frusto-conical shape and being slitted for admitting ambient air to said sensing means.

13. The thermostatic control unit of claim 10 which is particularly adapted as a replacement for a conventional non-thermostatic control valve in a central heating radiator and in which the radiator defines a valve-receiving portion which is externally threaded and forms a valve seat and includes also a matingly threaded union nut normally securing said conventional control valve to the radiator housing, said control unit comprising:

at least one annular abutment on said bushing;

said at least one annular abutment supporting a sealing means for effecting a sealing engagement with said valve seat, said at least one annular abutment further engaging with said union nut to secure said control unit with said valve-receiving housing;

whereby the originally installed union nut may be used to secure said thermostatic control unit as a replacement for the conventional control valve.

14. The thermostatic control unit of claim 12 which is particularly adapted as a replacement for a conventional non-thermostatic control valve in a central heating radiator and in which the radiator defines a valve-receiving portion which is externally threaded and forms a valve seat and includes also a matingly threaded union nut normally securing said conventional control valve to the radiator housing, said control unit comprising:

at least one annular abutment on said bushing;

said at least one annular abutment supporting a sealing means for effecting a sealing engagement with said valve seat, said at least one annular abutment further engaging with said union nut to secure said control unit with said valve-receiving housing;

whereby the originally installed union nut may be used to secure said thermostatic control unit as a replacement for the conventional control valve.

* * * * *